March 9, 1926. Re. 16,290
H. LINDSAY
SEAM FOR WOVEN WIRE BELTS
Original Filed Dec. 18, 1922 2 Sheets-Sheet 1
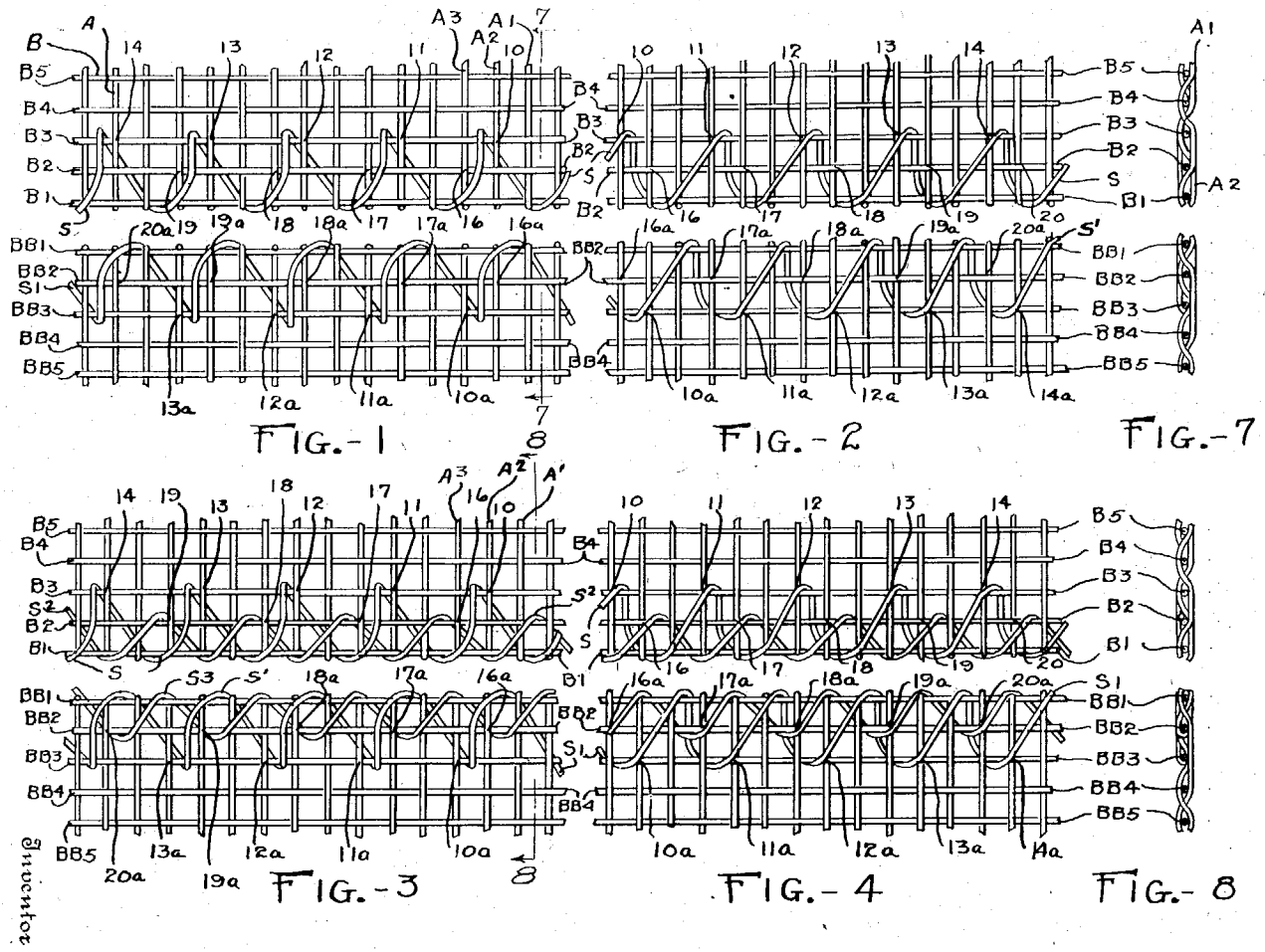
Inventor
Hamilton Lindsay
By Bates Macklin Bolick & Peere
Attorneys March 9, 1926. Re. 16,290
H. LINDSAY
SEAM FOR WOVEN WIRE BELTS
Original Filed Dec. 18, 1922 2 Sheets-Sheet 2
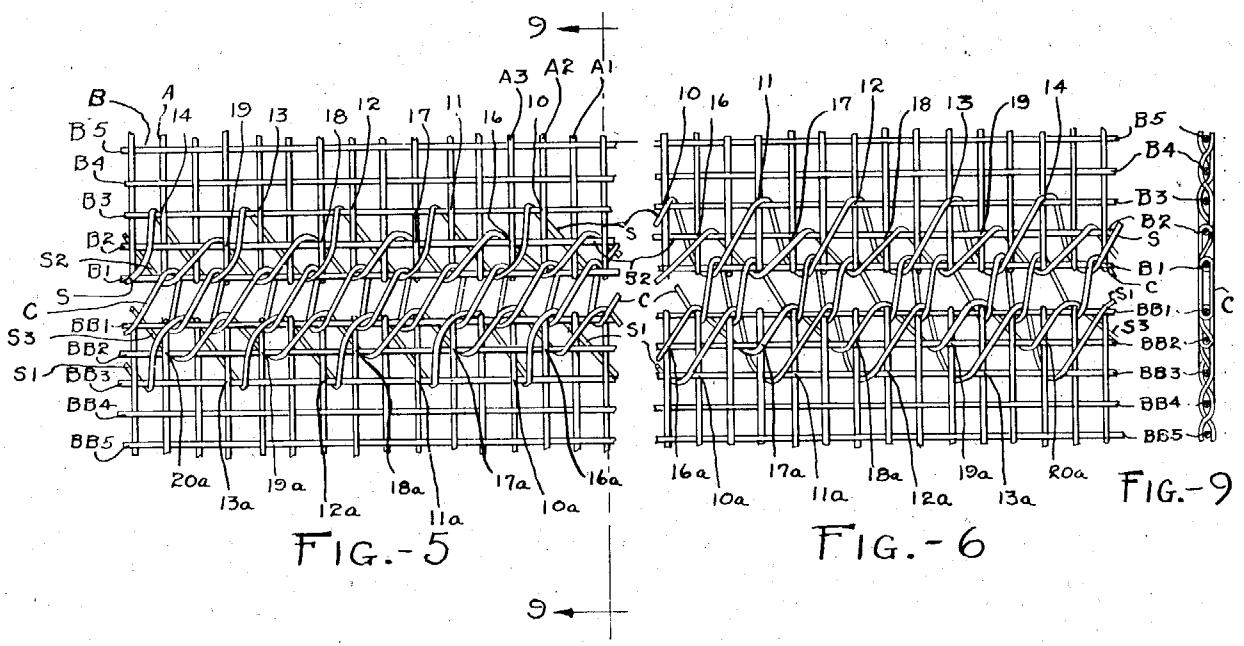
Inventor
Hamilton Lindsay
By Bates Macklin Bolwick & Peare
Attorneys Reissued Mar. 9, 1926.

Re. 16,290

UNITED STATES PATENT OFFICE.

HAMILTON LINDSAY, OF CLEVELAND, OHIO, ASSIGNOR TO THE LINDSAY WIRE WEAVING COMPANY, OF CLEVELAND, OHIO, A CORPORATION OF OHIO.

SEAM FOR WOVEN-WIRE BELTS.

Original No. 1,464,947, dated August 14, 1923, Serial No. 607,557, filed December 18, 1922. Application for reissue filed June 5, 1925. Serial No. 35,243.

*To all whom it may concern:*

Be it known that I, HAMILTON LINDSAY, a citizen of the United States, residing at Cleveland, in the county of Cuyahoga and State of Ohio, have invented a certain new and useful Improvement in a Seam for Woven-Wire Belts, of which the following is a full, clear, and exact description, reference being had to the accompanying drawings.

This invention relates to a method of joining the ends of a wire fabric to form an endless belt which is particularly useful in Fourdrinier paper machines. More particularly, my invention is concerned with a seam for lacing the ends of a belt having a special weave as set forth in my copending application, Serial No. 525,403, filed Dec. 28, 1921.

Briefly, the belt illustrated in my copending application embodies a fabric wherein the lower knuckles of the longitudinally extending or warp wires pass continuously beneath two or more cross or woof wires instead of only one. Accordingly, the warp wires are divided into groups, each preferably of three wires in number, during the weaving operation, and are manipulated so that one group forms one plane of the shed while the other two groups form the other plane of the shed, while the shuttle passes therebetween and across the loom. These groups are interchanged after each stroke of the shuttle whereby the fabric so formed has short knuckles on the upper side of the belt and long knuckles on the lower side thereof. This results in a construction which gives a longer wearing surface to the under side of the belt, thus increasing the life thereof.

One of the difficulties encountered in joining the ends of the belt above described is the provision of a seam which does not fill the interstices (which would render it difficult for water to pass through this seam when the belt is in use) and at the same time forms a sufficient support between the ends of the fabric so as not to strain the pulp. Another difficulty is the arrangement of closing wires which do not displace the woof wires so as to distort the mesh.

Accordingly, one of the objects of my invention is the provision of a seam having a sufficient space for the passage of water therethrough, and sufficient support between the ends of the fabric so that the pulp is properly drained and at the same time supported adjacent the seam, whereby the paper is not weakened. Another object is the provision of a seam for use in a belt constructed in the manner above set forth which will not weaken the wires adjacent the ends of the fabric. Furthermore, my invention includes a seam, the wires of which lie in substantially the same plane as the warp wires so that the wear occasioned by the passage of the seam across a suction box is not greater than that occurring on other parts of the belt.

The preferred embodiment for carrying out my invention is illustrated in connection with the accompanying drawings, and is hereinafter described in detail. The essential features are summarized in the claims.

In the drawings, Figures 1 and 2 are plan views illustrating the ends of a belt having a weave constructed as heretofore described and illustrating the application of a stitching wire, wherein Fig. 1 shows the top side of the belt, while Fig. 2 shows the bottom side thereof; Figs. 3 and 4 are views similar to Figs. 1 and 2 and show the application of a second stitching wire; Figs. 5 and 6 are views corresponding to Figs. 3 and 4 with the application of a closing wire; while Figs. 7, 8, and 9 are sections taken on the corresponding lines in Figs. 1, 3, and 5 respectively.

As shown in Figs. 1 to 6, A indicates the longitudinal or warp wires of the fabric and B the transverse or woof wires. In Figs. 7 to 9, the foremost warp wire $A^1$ passes over the transverse wire $B^1$ thence beneath two transverse wires $B^2$ and $B^3$, over the wire $B^4$, and thence beneath the next two transverse wires of which one only is shown at $B^5$. The next warp wire indicated at $A^2$ passes beneath the two woof wires $B^1$ and $B^2$, thence over the woof wire $B^3$, thence beneath the two woof wires $B^4$ and $B^5$, etc. The third warp wire $A^3$, shown particularly in Fig. 1, passes beneath the woof wire $B^1$, over the woof wire $B^2$, thence beneath the two woof wires $B^3$ and $B^4$, over the woof wire $B^5$, etc. The transverse wires $B^1$ to $B^5$ are illustrated as being on one end of the belt. The corresponding transverse wires on the opposite end of the belt are indicated as $BB^1$, $BB^2$, $BB^3$, $BB^4$, and $BB^5$ respectively.

The described construction is illustrated by reference characters, particularly in the upper half of Fig. 1, but the weave is the same for all figures illustrated. With this construction then, the fourth warp wire would correspond to the wire $A^1$, the fifth to the wire $A^2$, etc., whereupon the woof wires lie alternately over two and beneath one warp wire, etc.

The fabric shown and described thus has on its under side a series of long longitudinal knuckles, in contradistinction to the short or abrupt knuckles on the upper side. Accordingly, every third warp wire adjacent the same woof wire has a short knuckle on the upper side, as is shown particularly in Fig. 1, wherein the wire $B^3$ has short knuckles on the top side indicated at 10 to 14, etc. Similarly, the wire $B^2$, on the top side of the fabric has short knuckles, each positioned one warp wire to the left of those forming the short knuckles over the wire $B^3$. Accordingly the short knuckles for the wire $B^2$ are indicated at 16 to 19, etc.

The short knuckles 10, 14 and 16 to 19 above referred to are shown in the various figures as being located on the upper region of the belt. The corresponding short knuckles on the lower region of the belt are indicated at $10^a$ to $13^a$ and also at $16^a$ to $20^a$ respectively.

My invention, as heretofore stated, embodies a seam for closing the ends of a belt having a weave as heretofore described. To this end, I have shown in Figs. 1 and 2 the first step in forming the seam as embodying stitching wires S and $S^1$ which extend over the ends of the fabric and on opposite sides thereof to form loops for receiving the closing wires as will hereinafter be described.

Each stitching wire is carried back at the end of the belt a distance of one or more woof wires, whereby the stresses on the closing wire incident to the tension on the belt during operation will not pull the woof threads out of the fabric. Accordingly, I have shown a stitching wire S in Fig. 1 as passing over the woof wire $B^3$ and to the left of the short knuckles 10 to 14. This brings the inner loops of the stitching wire over a woof wire which is held in position on one side by the short knuckles 10 to 14, and on the other side by the short knuckles 16 to 20 which, as heretofore stated, are over the next woof wire toward the end of the belt. In this way, the woof wire is not distorted when tension is placed upon the belt. The outer loops of the stitching wire S are shown as passing around the woof wire $B^1$ and in such position as to avoid the knuckles on the top and bottom sides of the fabric adjacent the ends thereof. Thus the stitching wire lies substantially in the same plane as the warp wires whereby undue wear on the stitching wire, such as occasioned by the travel of a belt over the suction box in paper machines, is materially prevented. Accordingly, the stitching wire is threaded through every third row and the outer loop occurs in a row adjacent to the row in which an inner loop occurs. The weave of the stitching wire is employed in the same manner on both ends of the belt.

In Figs. 3 and 4, I have shown the next step in the making of a seam, namely the weaving of a second stitching wire $S^2$ and $S^3$. This stitching wire, however, also passes preferably through every third row and over the same woof wire but in rows different from those through which the first stitching wires extend. The second stitching wire thus forms a set of outer loops in rows different from those occupied by the first stitching wire but the inner loops of the second stitching wire occur in the same row as the outer loops on the first stitching wire. This prevents the crossing of one stitching wire over another adjacent a short knuckle and thus minimizes the wear occasioned by the travel of the belt across the suction boxes. By placing the inner loops of the second stitching wire over a woof wire different from those over which the first stitching wire extends, I may still position the second stitching wire adjacent short knuckles as heretofore described for the first stitching wire.

To close the belt, I provide a single closing wire C. This closing wire extends from one end of the belt to the other end and alternately between outer loops of the two sets of stitching wires. An important consideration in the formation of the seams is the provision of sufficient support for that portion of the pulp adjacent the seam. Accordingly, a single closing wire joining the alternate loops formed by two stitching wires provides a mesh substantially the same as the continuation of the warp wires. Moreover, as shown in Figs. 5 and 6, the closing wires on the under side of the belt are approximately parallel to the warp wires, whereby the wear on the under side of the belt is reduced to minimum.

The single closing wire is therefore looped around each end of the belt and around the end woof wire at each end of the belt. Moreover the closing wire loops are arranged to skip one warp wire and then two warp wires in succession throughout the width of the belt.

A seam constructed according to my invention transmits the operating stresses to woof wires remote from the ends of the belt and at the same time provides an anchorage adjacent short knuckles, whereby movement or displacement of any woof wire is prevented. The proper drainage is not interfered with, and at the same time the pulp is properly supported. A further feature set forth by my invention is the positioning of the stitching and closing wires so as to maintain the wires forming the seam within the same plane as the warp wires. In this way, the wear on the seam and cloth is substantially uniform.

I claim:

1. A seam for an endless belt wherein the weave comprises warp wires and woof wires, the warp wires having long knuckles on one side of the belt and short knuckles on the other side thereof, having two stitching wires passing through one end of the belt, at least one of the wires passing through the belt adjacent a short warp knuckle and forming loops adjacent the end of the belt, and a closing wire connecting said loops.

2. A seam for an endless belt wherein the weave comprises warp wires and woof wires, the warp wires having long knuckles on one side of the belt and short knuckles on the other side thereof, having two stitching wires adjacent one end of the belt, one of the stitching wires passing through the belt adjacent a short knuckle and forming loops adjacent the ends of the belt, and a closing wire passing through said loops for joining the ends of the belt.

3. A seam for an endless belt wherein the weave comprises warp wires and woof wires, the warp wires having long knuckles on one side of the belt and short knuckles on the other side thereof, having two stitching wires at one end of the belt, each of said wires passing through the belt adjacent a short warp knuckle, and a closing wire passing alternately through said loops and joining the ends of the belt.

4. A seam for an endless belt wherein the weave comprises warp wires and woof wires, the warp wires having long knuckles on one side of the belt and short knuckles on the other side thereof, having two stitching wires adjacent one end of the belt, the stitching wires forming outer loops over the same woof wire and forming inner loops over different woof wires, at least one of the stitching wires passing through the belt adjacent a short warp knuckle, and a closing wire passing alternately through said loops and joining the ends of the belt.

5. A seam for an endless belt wherein the weave comprises warp wires and woof wires, the warp wires having long knuckles on one side of the belt and short knuckles on the other side thereof, having two stitching wires passing through one end of the belt and adjacent different rows to form outer loops, one of said stitching wires passing through the belt so as to form inner loops, each inner loop passing over a woof wire which has a short warp knuckle adjacent said loop, and a closing wire passing alternately through said outer loops for joining the ends of the belt.

6. A seam for an endless belt wherein the weave comprises warp wires and woof wires, the warp wires having long knuckles on one side of the belt and short knuckles on the other side thereof, having two stitching wires threaded through one end of the belt so as to form outer loops over the same woof wire and to form inner loops over different woof wires, the inner loop of one wire occupying the same row as the outer loop of the other wire, said stitching wires passing through the belt over inner woof wires, the warp wire on one side of the stitching wires forming a short warp knuckle over said woof wires, and that on the other side forming a short warp knuckle over the next woof wire toward the end of the belt, and a closing wire passing through some of said loops and joining the ends of the belt.

7. A seam for an endless belt wherein the weave comprises warp wires and woof wires, the warp wires having long knuckles on one side of the belt and short knuckles on the other side thereof, having two stitching wires and a closing wire, one of said stitching wires extending over a woof wire remote from the end of the belt, the warp wire on one side of the stitching wire having a short warp knuckle adjacent to the woof wire, and the warp wire on the other side of the stitching wire forming a short knuckle on the adjacent woof wire.

8. A seam for an endless belt wherein the weave comprises warp wires and woof wires, the warp wires having long buckles on one side of the belt and short knuckles on the other side thereof, having two stitching wires adjacent one end of the belt, each of said stitching wires passing through the belt over different woof wires, and each of said woof wires having a short warp knuckle adjacent said stitching wires, at least one of said stitching wires being passed around the end of the belt to form loops, and a closing wire extending across the ends of the belt and passing through said loops.

9. A seam for an endless belt wherein the weave comprises warp wires and woof wires, the warp wires having long knuckles on one side of the belt and short knuckles on the other side thereof, having two stitching wires passing around the end of the belt to form outer and inner loops, the outer loops occupying different rows and the inner loops passing over woof wires in such position that the short warp knuckle passes over the woof wire adjacent said stitching wire, and a closing wire extending across the end of the belt and passing through the loops in one of the stitching wires.

10. A seam for an endless belt wherein the weave comprises warp wires and woof wires, the warp wires having long knuckles on one side of the belt and short knuckles on the other side thereof, having two stitching wires adjacent one end of the belt, said stitching wires forming outer loops over the same woof wire and inner loops over different woof wires, all of the inner loops of one stitching wire being over the same woof wire, and each woof wire having a short warp knuckle on one side of the stitching wire, and a closing wire passing alternately through said outer loops for joining the ends of the belt.

11. A seam for an endless belt wherein the weave comprises warp wires and woof wires, the warp wires having long knuckles on one side of the belt and short knuckles on the other side thereof, having two stitching wires passing over one end of the belt so as to provide outer and inner loops, each inner loop being positioned on every third row and adjacent a short warp knuckle, and a closing wire passing across the ends of the belt and passing through the outer loops in one of the stitching wires.

12. A seam for an endless belt wherein the weave comprises warp wires and woof wires, the warp wires having long knuckles on one side of the belt and short knuckles on the other side thereof, having two stitching wires adjacent each end of the belt, each stitching wire forming outer loops over the end of the belt and inner loops over an inner woof wire and adjacent a short warp knuckle, and a closing wire passing alternately through the outer loops on each end of the belt 13. A seam for an endless belt having a single closing wire connecting the ends of the belt, the closing wire being looped around the end woof wires, the loops on one end of the belt being arranged to skip one warp wire and then two warp wires in succession, and means for holding the end woof wires in position.

14. A seam for an endless belt having a single closing wire looped around the ends of the belt, the loops being arranged to skip one warp wire and then two warp wires in succession, all of said loops on both ends of the belt passing over the end woof wires, and means for holding the end woof wires in adjusted position.

15. A seam for an endless belt having a closing wire connecting the ends of the belt, said wire having loops which on one end of the belt are arranged to skip one warp wire and then two warp wires in succession.

16. A seam for an endless belt having a closing wire connecting the ends of the belt, said wire having loops which on each end of the belt are arranged to skip one warp wire and then two warp wires in succession, and means other than the closing wire for retaining the end woof wires in place.

In testimony whereof I hereunto affix my signature.

HAMILTON LINDSAY.